Dec. 29, 1953 G. L. HAGER 2,664,189
CONVEYER FEED MECHANISM
Filed Feb. 9, 1948 2 Sheets-Sheet 1
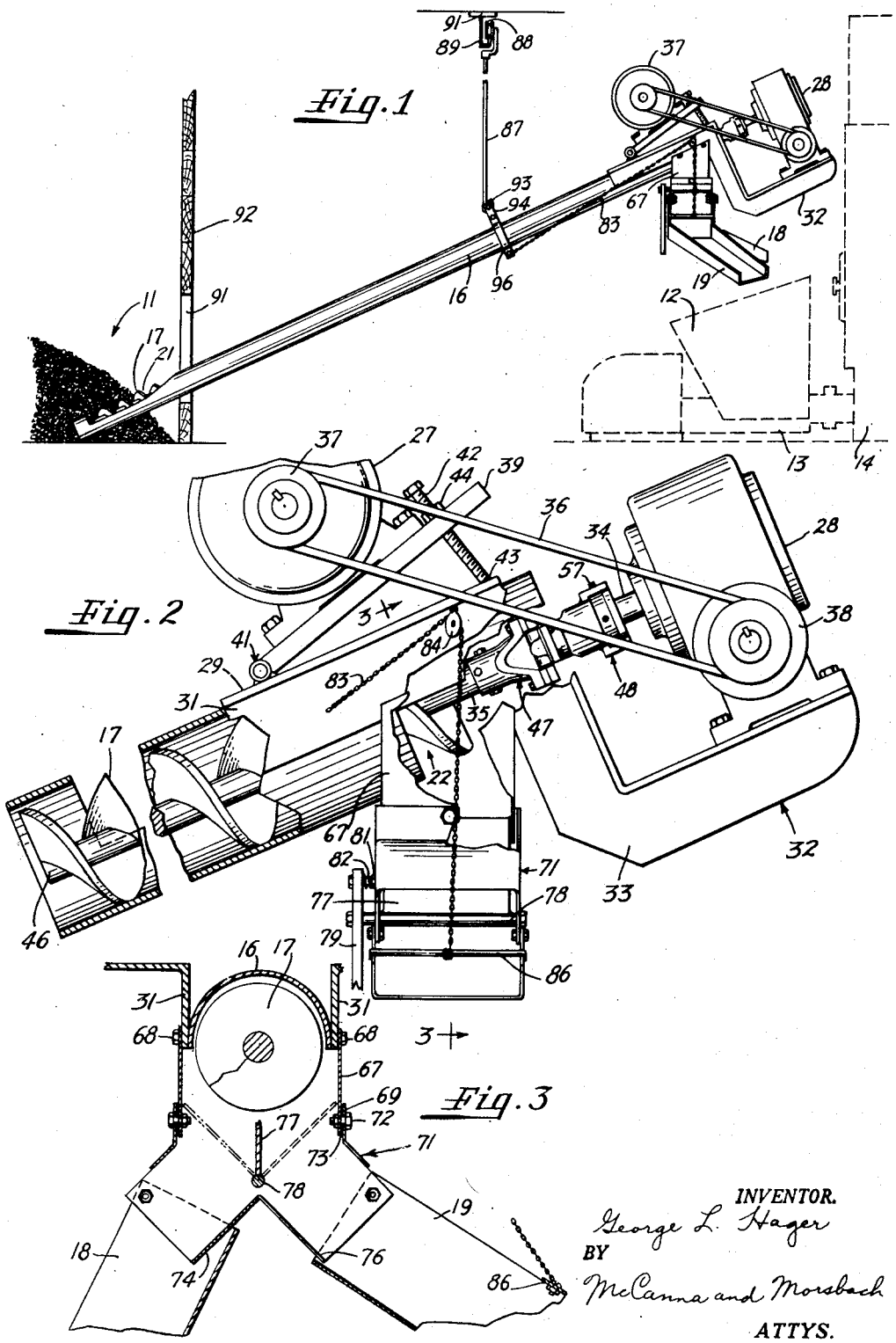
INVENTOR.
George L. Hager
BY
McCanna and Morsbach
ATTYS.

Dec. 29, 1953 G. L. HAGER 2,664,189
CONVEYER FEED MECHANISM
Filed Feb. 9, 1948 2 Sheets-Sheet 2
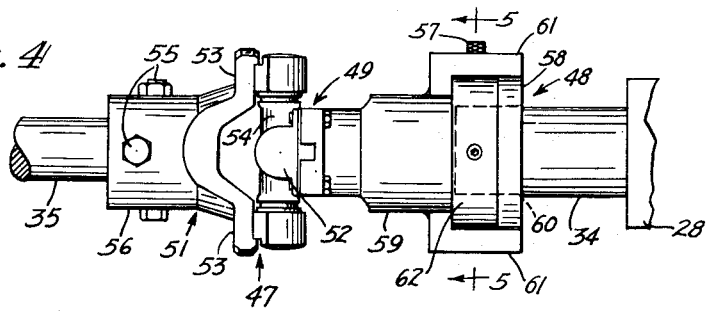
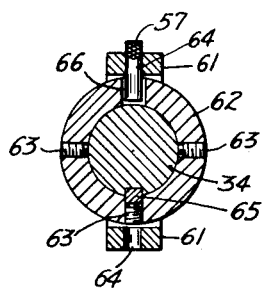
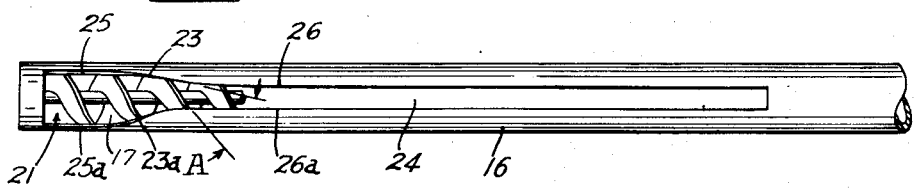
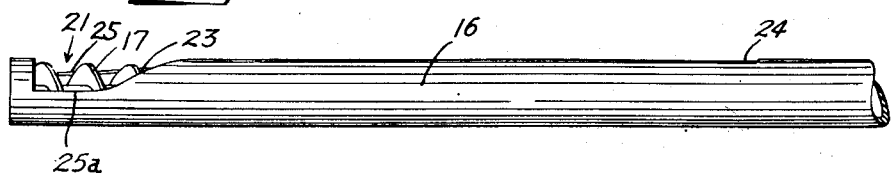
INVENTOR.
George L. Hager
BY
McCanna and Morsbach
ATTYS.

Patented Dec. 29, 1953

2,664,189

UNITED STATES PATENT OFFICE 2,664,189

CONVEYER FEED MECHANISM

George L. Hager, Rockford, Ill.

Application February 9, 1948, Serial No. 7,097

6 Claims. (Cl. 198—213)

This invention relates to a conveyer and more particularly to a screw type conveyer disposed in a tube for conveying coal and the like from a stock pile to another station from which the coal is fed to a furnace or used as desired.

A primary object of the invention is to provide a conveyer of the above character with driving means for the screw which permits floating of the screw throughout its entire length in the tube as required during the advance of coal through the tube and which also supports the screw in the housing.

Another object of the invention is to provide a conveyer of the above character with means for conveying pieces of coal, foreign bodies, or the like that are too large to pass through the tube to a position along the tube where they may be readily removed by an operator.

Another object of the invention is to provide a novel shear pin connection between the driving means and the screw wherein the respective parts are retained in an assembled relation in the event of the shearing of the pin.

Another object of the invention is to provide a conveyer of the above character which is simple in construction, which is rugged and sturdy in operation, which has a relatively long life, and which is relatively inexpensive to manufacture.

Other objects and advantages of the invention will become apparent from the following detailed description taken in connection with the accompanying drawings, in which—

Figure 1 is an elevational view of a conveyer embodying the invention;

Fig. 2 is an enlarged view similar to Figure 1 having cutaway portions to expose internal parts of the conveyer;

Fig. 3 is a sectional view taken substantially along the line 3—3 of Fig. 2;

Fig. 4 is a fragmentary view of the conveyer showing a universal joint and a shear pin connection utilized in the conveyer;

Fig. 5 is a sectional view taken substantially along the line 5—5 of Fig. 4;

Fig. 6 is a fragmentary top plan view of the tube; and

Fig. 7 is a side view of Fig. 6.

Referring now to the drawings, the invention is shown embodied in a conveyer conveying coal from a stockpile 11 to hoppers 12 mounted on conventional stokers 13 for feeding coal to furnaces 14. In general, the conveyer comprises a tube 16 housing a screw 17 mounted in the tube for rotation. The screw coacts with the walls of the tube to advance the coal from one station to another station. At its upper end the conveyer is provided with chutes 18 and 19 for conducting the coal to the hoppers 12 after it has been discharged from the tube 16.

The tube 16 in the present instance is provided at one end with a coal receiving opening 21 formed by removing an upper portion of the tube. The extreme end of the tube adjacent the opening 21 is also open and some coal enters the tube through this opening. At its opposite end the tube 16 is provided with a coal discharge opening 22, see Fig. 2, formed by removing the lower portion of the tube 16 inwardly from the extreme upper end thereof.

One phase of the invention is concerned with the provision of means wherein foreign bodies, pieces of coal and the like, too large to enter the tube 16 through the coal receiving opening 21 are conveyed away from the opening and are advanced to a position along the tube 16 wherein they may be removed from the conveyer. For this purpose a forward edge 23, see Figs. 6 and 7, of the coal receiving opening 21 is pre-shaped and coordinated with respect to the convolutions of the screw 17 so that foreign bodies and the like are conveyed along the top of the tube by cooperative action of the screw and the edge 23 of the opening, from the coal receiving opening 21 to an elongated slot 24 formed on the upper surface of the tube 16 and extending a substantial distance therealong from the coal receiving opening. To effect the foregoing, the forward edge 23 of the coal receiving opening 21 is smoothly curved upwardly and inwardly from a side 25 of the opening 21 to intersect a side 26, defining the elongated slot 24. With this construction it is to be understood that there are no sharp corners or the like between the coal receiving opening 21 and the slot 24, and since the forward edge 23 is coordinated with respect to the convolutions of the screw 17, any force, applied by the screw to an object will force the latter up along the forward edge 23 so as not to become wedged between the screw and the tube 16. The critical angle (the angle at which material is permitted to slide and not become wedged) shown in Fig. 6 as angle A measured between a convolution of the screw and the edge 23, depends on the material to be conveyed and consequently may be determined experimentally in any given case. For the embodiment of the invention shown in this instance the angle A should not be less than approximately 35 degrees. As shown in Fig. 7, a side 25a of the coal receiving opening is slightly lower than the side 25 to increase the size of the opening 21. The forward edge 23a of the opening is also preferably curved upwardly and inwardly so as to provide a smooth edge between the coal receiving opening and an edge 26a of the slot 24. The curving of the edge 23a should be such only as to remove any sharp shoulders. With this construction, when foreign bodies are so large that only a portion of the body is received in the coal receiving opening, it is to be understood that the coaction of the screw with the edges 23 and 23a tend to advance the body to the slot but the upward and inward curving of the forward edges 23 and 23a provide an unstable base for the body and so that it falls to one side or the other of the tube. If the tube is properly positioned in the coal pile, the body falls from the tube at a position whereby it rolls down along the outside surface of the pile away from the coal receiving opening 21.

The screw 17 in this embodiment of the invention is driven by a motor 27 connected to the screw 17 through a speed reducing gear train disposed in a gear box 28. The motor 27 is mounted on a platform 29. Preferably the latter is formed by angle irons 31 (see Fig. 3) mounted on opposite sides of the upper part of the tube 16 adjacent the discharge opening end thereof. The gear box 28 is mounted on a bracket 32 rigidly secured to the platform 29. Herein the bracket 32 is fashioned from angle irons 33 integral with the respective angle irons 31 and disposed in another plane substantially parallel with that of the platform 29. The bracket 32 is mounted at the discharge end 22 of the tube 16 in such a manner that a drive shaft 34 extending outwardly from the gear box 28 is in substantial axial alinement with a shaft 35 integral with and forming the driving end of the screw 17.

Power from the motor 27 is transmitted to the gear box 28 by a V-belt connection 36 between a motor pulley 37 and a gear box pulley 38. To facilitate maintaining the proper tension between the respective pulleys, the motor 27 is mounted so that the distance between the pulleys can be readily adjusted. To this end one side of a base 39 of the motor 27 is pivotally mounted on the platform 29 as by a hinge connection 41. At the opposite side of the base 39 is an adjusting screw 42 extending through a threaded recess in the base 39 in a conventional manner to have its end 43 abut against the platform 29. Thus, by merely adjusting the screw 42 to raise or lower the free side of the motor about the hinged side the desired tension in the V-belt connection may be obtained. A lock or jam nut 44 disposed on the screw 42 is arranged to be screwed against the base 39 after the base has been elevated to a desired adjusted position.

Another phase of my invention is concerned with mounting and supporting the screw 17 in the tube 16 so that the screw has floating movement in the tube throughout its length between the coal receiving opening 21 and the coal discharge opening 22 during the advance of coal through the tube. To effect the aforegoing, in the present instance, an end 46 of the screw 17 adjacent the coal receiving opening 21 is freely disposed in the tube 16 so that in the normal position of the parts of the conveyer the end 46 floats in the tube 16. At its opposite end the screw 17 is connected to the drive shaft 34 by a Hooke's type universal joint 47 and a shear pin connection 48. Preferably the universal joint comprises two yoke members 49 and 51, see Figs. 4 and 5, having spaced projecting portions 52 and 53, respectively, pivotally interconnected at diametrically opposite sides of a spider 54 disposed between the yokes. The joint 47 is connected to the shaft 35 by sliding a sleeve 56 of the yoke 51 over the end of the shaft 35 and securing the sleeve in place by bolts 55 extending through the sleeve 56 and the shaft 35. The aforegoing joint construction permits floating movement of the screw 17 throughout its length as required by the size of the pieces of coal being advanced through the tube. Experience shows that this construction has an extremely long life due to the fact that the wearing of parts is minimized with this floating mounting.

The shear pin connection 48 in the present embodiment of the invention provides a structure such that when a pin 57 has been sheared the universal joint 47 and the screw 17 do not become axially displaced with respect to the driving shaft 34 although the driving connection between the shaft 34 and the screw 17 has been made ineffective. For this purpose a disc 58 (see Figs. 2, 4 and 5), having a central opening 60 for receiving the drive shaft 34 is spaced axially from the end of a shaft portion 59 of the yoke 49 by diametrically spaced brackets 61 secured to the shaft portion 59 and the outer periphery of the disc 58 to provide a rigid structure. Disposed between the end of the shaft portion 59 and the disc 58 is a collar 62 mounted on the end of the shaft 34 by annularly spaced set screws 63 extending through the collar 62 and abutting against the shaft 34. It is to be understood that the collar 62, when in the assembled relation, is keyed to the shaft by a key 65 and turns with the driving shaft 34. The shear pin 57 extends through an opening 64 formed in one of the brackets 61 and fits into a radially extending opening 66 formed in the collar 62. It is to be understood also that the pin 57 forms the sole driving connection between the shaft 34 and the yoke 49. In normal operation the tube 16 is inclined as shown in Figure 1. As a consequence the force of gravity tends to pull the screw 17 downwardly. With the above construction, even though the pin 57 should shear, due to an excessive overload or the like, the screw 17 and the shaft 35 will be maintained in their assembled position and will not be displaced relative to the shaft 34. This is because the collar 62 engages the disc 58 and prevents axial displacement of the parts and the side walls of the opening in the disc 58 engage the shaft 34 and prevent appreciable transaxial displacement of the respective parts. It is to be understood that this construction permits of ready assembly and disassembly. Thus, to assemble the parts in a driving relation, it is only necessary to position the collar 62 between the disc 58 and the end of the shaft portion 59 and move the respective parts so that the drive shaft 34 projects through the disc 58 to a position where the collar 62 can be secured in position by the set screws 63. The pin 57 is then placed in position and the driving connection between the gear box 28 and the screw 17 is established.

The chutes 18 and 19 are disposed on the conveyer to receive the coal as it is discharged from the tube 16 through the discharge opening 22. To this end a suitable tube 67 is disposed immediately under the discharge opening 22 so that the opening in the tube 67 is in registry with the discharge opening. At its upper end the tube 67 is secured to the angle irons 31 as by bolts 68. At its lower end (see Fig. 3) an upper connection 69 of a Y-connection 71 is pivotally supported thereon. Each of the pivotal connections is formed by a bolt 72 extending through the walls of both the tube 67 and the upper connection 69. A collar 73 is disposed between the head of the bolt and the wall of the tube 67. The diameter of the collar 73 is slightly less than that of the opening in the wall of the upper part 69 of the connection through which the collar extends, and the collar is thicker than the wall of the upper part 69. Thus the Y-connection 71 is free to rotate about the bolt 72 and the collar 73. The head of the bolt 72 is larger than the opening in the wall of the upper part 69 and the nut screwed on the end of the bolt is larger than the diameter of the hole in the tube 67 so that the respective parts are retained in an assembled relation.

The chutes 18 and 19 herein are in the form of channel members having a U-shaped cross-section and are pivotally connected on the respective depending connections 74 and 76 of the Y-connection 71. The pivotal connections for this purpose are constructed in a manner similar to that described heretofore.

Means is provided for deflecting the coal being discharged into the upper connection 69 to either or both connections 74 and 76. For this purpose a vane type valve 77 mounted on the interior of the Y-connection 71 is utilized. The vane is mounted on a shaft 78 rotatably supported on opposite sides of the Y-connection 71. Rotation of the shaft 78 is effected by a handle 79 mounted on an external end of the shaft. As shown in Fig. 3, by varying the position of the vane 77 the coal being discharged from the tube can be deflected to either chute 18 and 19 as shown by the dotted lines or to both chutes simultaneously when the vane is in the middle position as shown. A bolt head 81 (see Fig. 2) projecting through an opening at one end of the handle 79 is arranged to abut against the side of the Y-connection 71 for maintaining the vane 77 in the desired adjusted position. To insure that the bolt head 81 is urged into frictional engagement with the Y-connection 71 a spring 82 is interposed between the head 81 and the handle 79.

The elevation of the chutes 18 and 19 can be adjusted to suit any individual hopper installation. In this embodiment of the invention the chute elevation is adjusted by a chain 83 threaded through a pulley 84 secured to a position overlying the chutes on the platform 29 and having one end secured to a rib 86 mounted on the chutes intermediate their ends. Thus, by simply reeling in or paying out the chain 83, the elevation can be varied.

Another phase of the invention is concerned with means for supporting the conveyer so that the latter is readily usable to convey coal from a coal pile to a desired station. In some installations a single conveyer may be utilized to fill any one of a battery of hoppers 12 alined in a row. Accordingly, it is desirable to provide for free movement of the conveyer to any desired position so that any desired hopper in the battery can be filled. In this embodiment of the invention the conveyer is shown as being suspended from one end of a rod 87 pivotally connected at its opposite end to a roller unit 88 mounted on a rail 89 secured to overhead rafters 91 or the like and in substantial parallel relation with the hoppers. The pivotal connection between the rod 87 and the roller unit 88 may be of any conventional type that permits swinging of the rod 87 in all directions with respect to the roller unit. With this construction it is to be understood that the conveyer may be positioned at any point along the rail 89 and the pivotal connection permits the tube 16 to be swung far enough to one side to permit the coal receiving end of the tube 16 to be inserted in a door or opening 91 of a coal bin 92 or the like. Also this pivotal connection permits the tube 16 to be adjusted relative to the coal pile as the latter changes its configuration due to the removal of coal therefrom. The lower end of the rod is formed as a hook 93 which is shaped to interfit with an eye 94 formed on a collar 96 encircling the tube intermediate its ends. The collar 96 is positioned so that the coal receiving opening 21 is disposed in the stockpile and the discharge opening 22 is elevated to a position overlying the respective hoppers when in the suspended position.

I claim:

1. A conveyer comprising a screw having a shaft at one end, a tube for housing said screw, said tube being formed with an opening in its upper surface adjacent one end and with an elongated narrow slot along the top of the tube intermediate its ends, at least one of the edges of the tube defining said opening adjacent one end extending upwardly and transversely of the axis of the tube inward in a smooth curve to merge smoothly with an edge defining said elongated slot, said upwardly extending edge extending transversely of the axis of the tube inward angularly between the direction of the axis of the tube and the direction of the convolutions of the screw at the top of the screw, driving means for rotating said screw shaft, and a universal joint disposed between said driving means and said shaft supporting said shaft within the tube and permitting displacement of said screw transversely of the axis of the tube.

2. A conveyer, comprising a rotary screw, and an upwardly inclined tube surrounding said screw, said tube having a wide opening along its upper surface adjacent its lower end and an elongated narrow slot along its upper surface intermediate its ends, at least one of the edges of the tube defining said opening at one end extending upwardly and transversely of the axis of the tube inward in a smooth curve to merge smoothly with an edge defining said elongated slot, said upwardly extending edge extending transversely of the axis of the tube inward angularly between the direction of the axis of the tube and the direction of the convolutions of the screw at the top of the screw, whereby oversized objects are conveyed from the wide opening upwardly along said smoothly curved edge to said narrow elongated slot.

3. A conveyer comprising an upwardly inclined tube having a material receiving opening at its lower end and a material discharge opening at its upper end, a motor, a shaft driven by said motor extending in substantial axial alinement with said tube at the upper end thereof, a universal joint connected to said driven shaft, and a screw received loosely in said tube and extending axially therethrough, said screw having a free lower end and being connected at its upper end to said universal joint and suspended thereat solely from said universal joint for limited movement within said tube transversely of the axis of said tube during the advance of material upwardly along the screw within the tube.

4. A conveyer comprising an upwardly inclined tube having a material receiving opening at its lower end and a material discharge opening at its upper end, a motor, a shaft driven by said motor extending in downwardly inclined fashion in substantial axial alinement with the upper end of said tube, a collar secured to said shaft, a connection bracket extending downwardly from said collar and having a portion overlying the top of said collar, a shear pin interconnecting said collar and said connection bracket to impart the drive from said shaft to said connection bracket, a universal joint carried by said connection bracket, and a screw received loosely in said tube and extending axially therethrough, said screw having a free lower end and being connected at its upper end to said universal joint and suspended thereat solely from said universal joint for limited movement within said tube transversely of the axis of said tube during the advance of material upwardly along the screw within the tube, said overlying portion of the connection bracket upon breakage of the shear pin engaging said collar to retain the assembly of the connection bracket, universal joint and screw against displacement downwardly in the tube.

5. A conveyor comprising a screw having a shaft at one end, a tube for housing said screw having an upwardly extending opening at one end and an opening at the opposite end, said tube being formed with an elongated slot along the top of the tube in communication with the upwardly extending opening, one of the edges of the tube between the upwardly extending opening and the elongated slot being smoothly curved and extending angularly between the axial direction of the tube and the direction of the convolutions of the screw at the top of the screw whereby objects too large to pass through the tube are conveyed to a position away from the upwardly extending opening wherein they are readily removable from the tube, driving means for said screw mounted on said tube and having a drive shaft in substantial axial alinement with said screw shaft, and a universal joint disposed between said shafts for effecting a driving connection between said shafts and permitting movement of said screw in said tube transversely of the axis of said tube.

6. A conveyor comprising an upwardly inclined tube having a material receiving opening at its lower end and a material discharge opening at its upper end, a motor and a shaft driven by said motor positioned adjacent the upper end of said tube, a universal joint connected to said shaft, a screw loosely received in said tube and extending axially therethrough, said screw having a free end at said lower end of said tube and being connected at its upper end to said universal joint and suspended thereat solely from said universal joint for limited movement within said tube transversely of the axis of said tube during the advance of material upwardly along the screw within the tube.

GEORGE L. HAGER.

References Cited in the file of this patent

UNITED STATES PATENTS

| Number | Name | Date |
|---|---|---|
| 1,011,048 | Gardner | Dec. 5, 1911 |
| 1,324,145 | Davidson | Dec. 9, 1919 |
| 1,639,346 | Liggett | Aug. 16, 1927 |
| 1,640,704 | Hunt | Aug. 30, 1927 |
| 1,662,575 | Hayes | Mar. 13, 1928 |
| 1,804,287 | Spry | May 5, 1931 |
| 1,848,657 | Prescott | Mar. 8, 1932 |
| 1,914,485 | Burton | June 20, 1933 |
| 1,933,404 | Allen | Oct. 31, 1933 |
| 2,033,890 | Mittendorf | Mar. 10, 1936 |
| 2,050,630 | Reid | Aug. 11, 1936 |
| 2,051,282 | Yerges | Aug. 18, 1936 |
| 2,126,267 | Lippert | Aug. 9, 1938 |
| 2,165,627 | Fricchione | July 11, 1939 |
| 2,245,997 | Olson | June 17, 1941 |
| 2,261,050 | Casey | Oct. 28, 1941 |
| 2,290,039 | Ford | July 14, 1942 |
| 2,332,729 | Klosterman | Oct. 26, 1943 |
| 2,430,327 | Clites | Nov. 4, 1947 |
| 2,455,750 | Freed | Dec. 7, 1948 |
| 2,499,929 | Nelson et al. | Mar. 7, 1950 |
| 2,503,917 | Nelson et al. | Apr. 11, 1950 |
| 2,513,784 | Blomquist | July 4, 1950 |
| 2,558,006 | Shriver et al. | June 26, 1951 |